US006800328B2

(12) United States Patent
Fong et al.

(10) Patent No.: US 6,800,328 B2
(45) Date of Patent: Oct. 5, 2004

(54) PROCESS FOR IMPREGNATING POROUS PARTS

(75) Inventors: Paul Po Hang Fong, Vancouver (CA); Emerson R. Gallagher, Vancouver (CA); Svetlana Loif, Richmond (CA)

(73) Assignee: Ballard Power Systems Inc., Burnaby (CA)

(*) Notice: Subject to any disclaimer, the term of this patent is extended or adjusted under 35 U.S.C. 154(b) by 171 days.

(21) Appl. No.: 10/209,951

(22) Filed: Jul. 31, 2002

(65) Prior Publication Data

US 2003/0049378 A1 Mar. 13, 2003

Related U.S. Application Data

(60) Provisional application No. 60/331,349, filed on Jul. 31, 2001, and provisional application No. 60/342,657, filed on Dec. 20, 2001.

(51) Int. Cl.⁷ .................................................. B05D 3/00
(52) U.S. Cl. ....................... 427/352; 427/353; 427/354; 427/388.1
(58) Field of Search ................................. 427/352, 353, 427/388.1, 354

(56) References Cited

U.S. PATENT DOCUMENTS

| | | | |
|---|---|---|---|
| 3,826,680 A | 7/1974 | Rio et al. | 117/119.6 |
| 4,147,821 A | 4/1979 | Young | 427/295 |
| 5,624,769 A | 4/1997 | Li et al. | 429/32 |

FOREIGN PATENT DOCUMENTS

| | | | |
|---|---|---|---|
| ES | 550559 | * | 8/1987 |
| JP | 52-028904 | * | 3/1977 |
| JP | 60-012672 | | 1/1985 |
| JP | 60-65781 | | 4/1985 |
| JP | 62-126562 | | 6/1987 |
| JP | 63-098965 | | 4/1988 |
| JP | 63-128562 | | 6/1988 |
| JP | 63-162586 | | 7/1988 |
| JP | 8-222241 | | 8/1996 |
| WO | WO 99/05738 | | 2/1999 |
| WO | WO 00/02277 | | 1/2000 |
| WO | WO 00/64808 | | 11/2000 |
| WO | WO 01/43964 | | 6/2001 |
| WO | WO 02/47833 | | 6/2002 |

OTHER PUBLICATIONS

Neilson et al, Materials Science and Engineering, 24(2), pp. 283–285, 1976.*

Maldaner et al, Giesserei–Praxis, 23/25, pp 408–410, 1990.*

Damico, "Acrylics," in Reinhart and Brinson (eds.), *Engineered Materials Handbook* vol. 3, ASM International, USA, 1990, pp. 119–125.

Taricco and Moulding, "Adhesives and Sealants Curing and Cure Controls," in Reinhart and Brinson (eds.), *Engineered Materials Handbook* vol. 3, ASM International, USA, 1990, pp. 709–715.

Loctite Corporation, "Loctite Worldwide Design Handbook, "1996/97, pp. 97–112 and pp. 206–209.

* cited by examiner

*Primary Examiner*—Erma Cameron
(74) *Attorney, Agent, or Firm*—Seed IP Law Group PLLC

(57) ABSTRACT

A process for impregnating a porous part is provided. In one embodiment, the process comprises impregnating the part with an impregnant that is not water soluble, and curing the impregnated part in a water bath. In another embodiment, the process comprises impregnating a part with an impregnant that is not water soluble, washing the impregnated part in a washing solution, and then curing the impregnated part in a water bath.

36 Claims, 2 Drawing Sheets

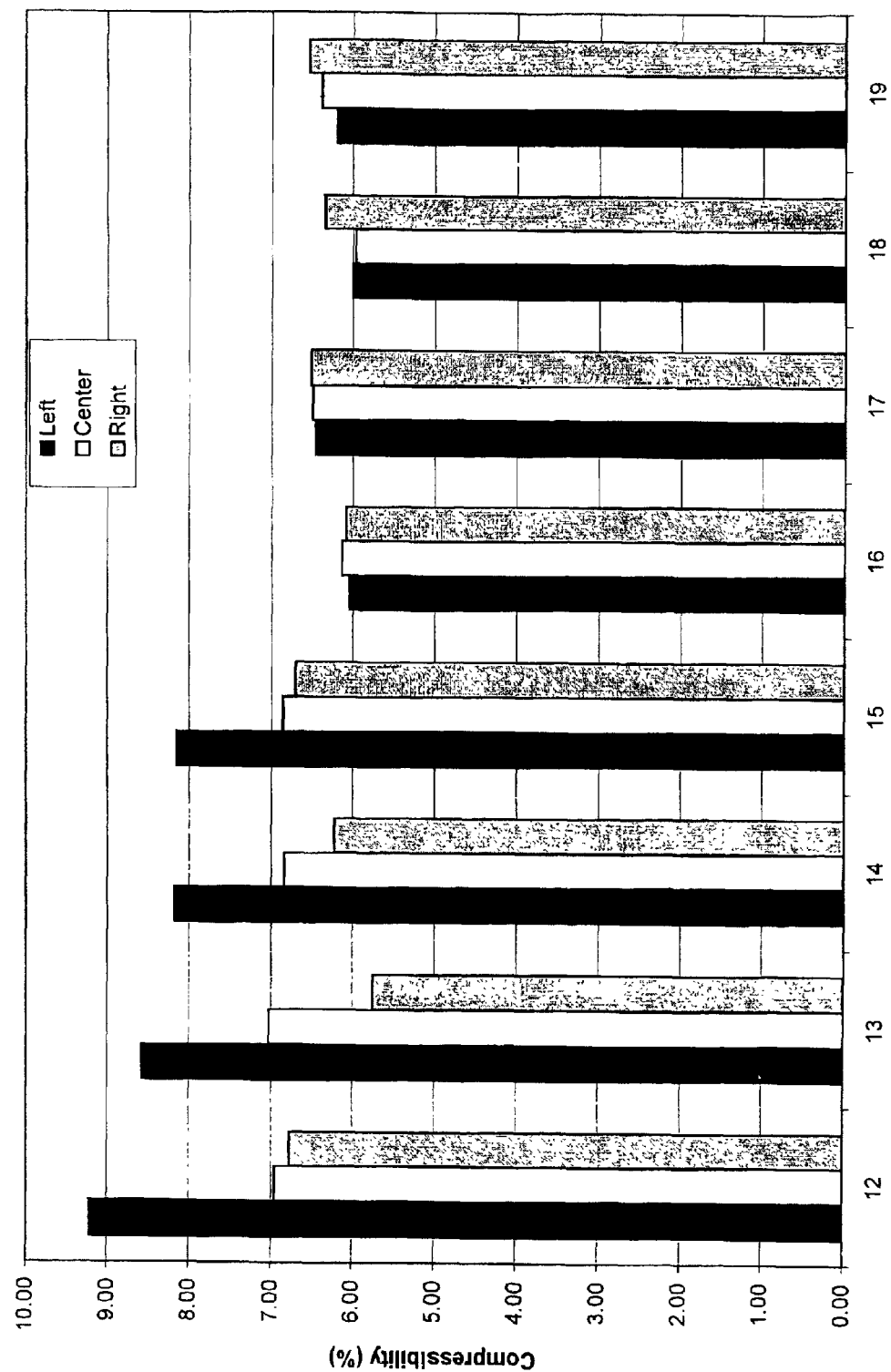

PROCESS FOR IMPREGNATING POROUS PARTS

CROSS-REFERENCE TO RELATED APPLICATIONS

This application claims the benefit of U.S. Provisional Patent Application No. 60/331,349 filed Jul. 31, 2001, and U.S. Provisional Application No. 60/342,657 filed Dec. 20, 2001, both of which applications are incorporated herein by reference in their entireties.

BACKGROUND OF THE INVENTION

1. Field of the Invention

The present invention generally relates to processes for impregnating porous parts and, more specifically, to processes for impregnating porous parts with an impregnant that is not water soluble and curing the impregnated parts in a water bath.

2. Description of the Related Art

Impregnation of porous parts is a common technique employed in a variety of industries for a variety of reasons. Stone, brick, ceramic, wood, polymer, aggregate, cermet, and porous metal parts, for example, are commonly impregnated. Typically, a sealant is impregnated into the part because the porosity is undesirable in the intended end use of the part. In some applications, it is only necessary to seal the pores on the surface of the part. In other applications, thorough impregnation of the part is necessary. Further, in certain applications it may be possible to over-impregnate a part, so careful control of the level of impregnation is required.

By way of example, fuel cells, including solid polymer electrolyte fuel cells, utilize initially porous components such as separator plates. Separator plates are commonly made from graphite, graphitized carbon or carbon-resin composites.

For example, expanded graphite sheets, such as the material available from Graftech Inc. (Cleveland, Ohio, U.S.A.) under the tradename GRAFOIL, may be used to form separator plates for fuel cells. Expanded graphite sheets are useful in this regard because they are relatively light, flexible and amenable to low-cost manufacturing methods, such as embossing.

Nonetheless, separator plates made from expanded graphite sheets are typically impregnated in order to achieve the desired levels of impermeability and mechanical stability (that is, structural strength and hardness). After impregnation the separator plates are substantially impermeable to the fluid reactants and/or coolants used in the fuel cell or fuel cell stack, mechanically stable and electrically conductive. Known impregnants suitable for such purposes include phenols, epoxies, melamines, furans, and acrylics, such as methacrylates, for example.

It is important that such plates be sufficiently impregnated to meet performance requirements. At the same time, it is possible to over-impregnate the plates, resulting in degradation or loss of desired structural and/or functional properties.

In addition, it is generally undesirable to have residual cured impregnant left on the surface of the impregnated plates. The presence of impregnant deposits on the surface of the cured plate can: affect the electrical conductivity of the plate; interfere with electrical contact between fuel cell components in the assembled cell/stack; be detrimental insofar as thickness tolerances are concerned; and, may also interfere with the function of surface features on the plate. Accordingly, impregnation process control is an important aspect of separator plate manufacture.

In typical industrial processes, curing of the impregnated parts is accomplished by dipping the parts in a hot water bath after washing and rinsing. The washing, rinsing and curing steps can occur in the same vessel. In applications where the impregnant contributes to desired characteristics such as the mechanical stability, and in particular the surface hardness, of the impregnated parts, the typical industrial process is undesirable.

Commercially available impregnants typically include surfactants or other solubilizing agents to make them water soluble. Such impregnants are made water soluble to facilitate washing and rinsing of the impregnated parts. Thus, the washing and rinsing steps are able to remove excess impregnant from the surface of the parts before curing. But, because the impregnant is water soluble, washing and rinsing also removes some impregnant from the pores near the surface of the part. This problem is further exacerbated by the hot water curing, as more impregnant is removed from the part during the curing process. As a result, insufficient impregnant is left in the surface pores of the part(s) to provide the requisite surface hardness. The lack of sufficient impregnant in the surface pores of the part(s) may also lead to sealing problems. The loss of impregnant is particularly problematic with thin impregnated parts where the surface-to-volume ratio is relatively high. Indeed, prior efforts to cure impregnated expanded graphite sheets using a hot water curing process have failed to achieve fuel cell separator plates having the desired levels of impermeability, mechanical stability and/or electrical conductivity.

Accordingly, there remains a need for improved methods for impregnating porous parts, such as fuel cell separator plates. The present invention fulfills this need and provides further related advantages.

BRIEF SUMMARY OF THE INVENTION

In brief, the invention is directed to a process for impregnating a porous part. In one embodiment, the process comprises impregnating the part with an impregnant that is not water soluble, and curing the impregnated part in a water bath.

In another embodiment, the process comprises impregnating a part with an impregnant that is not water soluble; washing the impregnated part in a washing solution; and then curing the impregnated part in a water bath.

The washing solution may comprise water and a surfactant, or other polar solvents, such as acetone, lower aliphatic alcohols (in particular, $C_1$–$C_4$ alcohols), and miscible mixtures thereof (including water-alcohol mixtures). Alternatively, the washing solution may comprise a nonpolar solvent, such as hydrotreated heavy naptha.

In another embodiment, a process for impregnating expanded graphite sheet is provided. The embodiment of the present process comprises impregnating the sheet with a heat-curable impregnant; washing the impregnated sheet in a washing solution; and curing the washed sheet in a water bath at a curing temperature, wherein the impregnant is not water soluble.

These and other aspects of the invention will be apparent upon reference to the attached figures and following detailed description.

BRIEF DESCRIPTION OF THE SEVERAL VIEWS OF THE DRAWINGS

FIG. 2 is a graph of the compressibility of impregnated expanded graphite fuel cell plates, measured as the percentage reduction in thickness of compressed regions of the plates relative to the original thickness. Samples 12–15 are plates that were cured in an autoclave as described in Comparative Example 1, and Samples 16–19 are plates that were impregnated and cured according to the present process as described in Example 3.

DETAILED DESCRIPTION OF THE INVENTION

Figure 1:
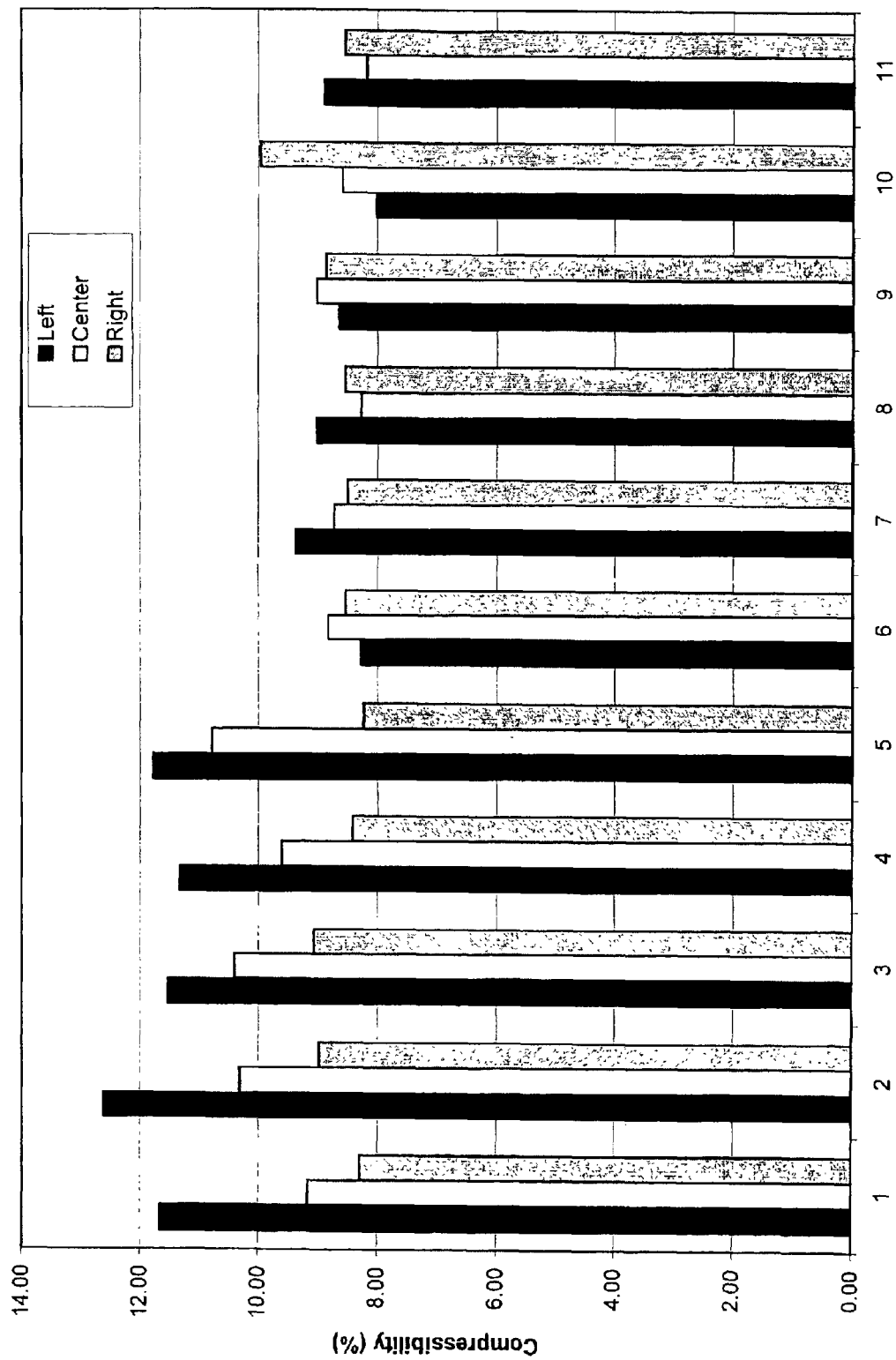
FIG. 1 is a graph of the compressibility of impregnated expanded graphite fuel cell plates, measured as the percentage reduction in thickness of compressed regions of the plates relative to the original thickness. Samples 1–5 are plates that were cured in an autoclave as described in Comparative Example 1. Samples 6–11 are plates that were impregnated and cured according to the present process as described in Example 2.

The present process allows for hot water curing of impregnated porous parts using an impregnant that is not water soluble. As used herein, an impregnant is not water soluble if it is substantially insoluble in water at process temperatures. An impregnant that is not water soluble is not removed from the surface pores of the impregnated part during curing in a water bath to such a degree as to adversely impact the characteristics of the cured part, such as impermeability, mechanical stability and/or electrical conductivity, for example. Where an impregnant comprises more than one component, the impregnant is not water soluble provided a substantial portion of the components are not water soluble, i.e., one or more of the components may be appreciably water soluble provided curing of the impregnant and/or the characteristics of the impregnated part are not adversely affected.

In one embodiment, the present process for impregnating a porous part comprises impregnating the part with an impregnant that is not water soluble, and curing the impregnated part in a water bath.

The present process is particularly suited for impregnating porous parts for applications in which the presence of impregnant in the surface pores of the parts impart desirable characteristics to the cured parts. Such porous parts may include, for example, stone, brick, ceramic, wood, polymer, aggregate, cermet, and porous metal parts, as well as parts comprising porous carbon.

For example, the present process may be employed to impregnate expanded graphite sheet useful for the manufacture of fuel cell separator plates. As used in this description and in the appended claims, "expanded graphite sheet" means sheet materials comprising expanded graphite, including composites thereof including, for example, the composite described in U.S. Pat. No. 5,885,728, and also includes laminates that include one or more layers comprising expanded graphite.

The choice of impregnant is not essential to the present method, provided that the impregnant is not water soluble. As mentioned above, suitable impregnants for expanded graphite fuel cell plates include phenols, epoxies, melamines, furans, and acrylics such as methacrylates, for example. The impregnant should be surfactant-free, as the presence of surfactant will tend to render it soluble.

The impregnant may be heat-curable, if desired, in which case the water bath is heated to at least the curing temperature of the impregnant. It may be advantageous to heat the temperature of the water bath to a temperature greater than the curing temperature of the impregnant, which may allow the curing process to take place in a shorter time than if the water bath was heated to the curing temperature of the impregnant. However, shorter curing time should be balanced against possible increased bleeding of impregnant from the part(s) due to the increased temperature of the water bath.

Alternatively, an anaerobic impregnant may be employed, and curing may be performed in the substantial absence of oxygen.

While not essential to the present process, it may be advantageous to choose an impregnant having components that are not very volatile under process conditions. Impregnant components having a significant vapor pressure at process temperatures may cause the impregnant to bleed out of the part(s) during curing. Choosing less volatile impregnants/components may assist in reducing bleeding of impregnant from the part(s). Furthermore, reducing bleeding of impregnant from the part(s) can decrease contamination of the curing medium by particles of cured impregnant and the deposition of such particles onto the surface of the part(s).

For similar reasons, it may also be advantageous to choose an impregnant having a low curing temperature. A resin with a higher curing temperature may have a longer gel time (that is, the time after which the impregnant becomes a continuous mass and will not flow), which may increase bleeding of impregnant from the part(s) as there is a longer time during which bleeding of the impregnant from the part(s) could occur or the impregnant could dissolve into the curing medium. Accordingly, selecting an impregnant with a low curing temperature may reduce the gel time, as well as allow a lower temperature water bath to be used, which may assist in reducing bleeding of impregnant from the part(s), which in turn may decrease contamination of the curing medium.

Optionally, selecting an impregnant that has at least two of the characteristics of low curing temperature, decreased gel time and components that are not very volatile under process conditions, may further reduce bleeding of the impregnant from the part(s).

In another embodiment, the present method further comprises washing the impregnated part in a washing solution prior to the curing step. Suitable washing solutions may comprise water and a surfactant or other solubilizing agent. The addition of surfactant to the washing solution permits the removal of excess impregnant from the surface of the impregnated part(s). The particular surfactant/solubilizing agent employed is not essential to the present process, and suitable surfactant/solubilizing agents may vary depending on the composition of the impregnant. Likewise, the concentration of surfactant/solubilizing agent and the duration of the washing step that will remove excess impregnant from the surface of the part(s) are not essential to the present process and may be empirically determined for a given application by persons skilled in the art.

Suitable washing solutions may also comprise other polar solvents, such as acetone, lower aliphatic alcohols (in particular, $C_1$–$C_4$ alcohols), with or without surfactants. For example, washing solutions comprising methanol, ethanol, or miscible mixtures thereof (including water-alcohol mixtures) may be suitable for some methacrylate-based impregnants. Alternatively, washing solutions comprising a non-polar solvent, such as hydrotreated heavy naptha, may be suitable for some impregnants.

The present process may also be used where the curing medium is a liquid other than water, such as oil, and the impregnant is not soluble in the curing medium.

The following examples are presented for purpose of illustration, not limitation.

COMPARATIVE EXAMPLE 1

Expanded graphite sheet fuel cell plates were baked in an oven for 30 min at 175° C. and a relative humidity of 30%. The baked plates were then transferred to an impregnation vessel (S-24×30-AUB; Imprex, Milwaukee, Wis.) containing a methacrylate resin available from Hernon Manufacturing under the tradename, HPS 991. The resin contains surfactant.

The impregnation vessel was sealed and the pressure inside the impregnation vessel was decreased from ambient to 0.3 kPa for 30 minutes to remove entrained air from the plates and resin. The vacuum was released, and then the pressure inside the impregnation vessel was increased from ambient to 620 kPa. The plates were allowed to soak at that pressure until the resin had filled about 98–100% of the void volume of the plates.

The impregnated plates were washed in an agitated water bath for 1 min and then rinsed under the same conditions. The washed and rinsed plates were then placed in a drying chamber connected to a Hygrex closed-loop drying system (Hygrex Spehr Industries, Bolton, ON, CA), and dried for 40 min at 35° C. The impregnated plates were then cured in an autoclave at 620 kPa (90 psi) and 135° C. for 1 h, under nitrogen. Total dwell time in the autoclave was 2 h.

Five of the cured plates were chosen at random. The dimensional stability of the five cured plates was determined by compressing the left corner, right corner and center of each plate under a 1380 kPa load, and measuring the change in thickness of the compressed region as a percentage of the original thickness. The results for the autoclaved plates are shown in FIG. 1 (see samples 1–5).

EXAMPLE 2

Expanded graphite sheet fuel cell plates identical to those described in Example 1 were impregnated as described in Example 1, except that the impregnant was a surfactant-free resin comprising polyglycol dimethacrylate, alkyl methacrylate and hydroxyalkyl methacrylate. The resin is not water soluble.

The impregnated plates were cured in a water bath at a temperature of 96° C. for 15–60 min.

The dimensional stability of random samples of the cured plates was determined as described in Example 1. FIG. 1 shows the results for the sample of plates cured for 30 min (see samples 6–11). Similar results were obtained for the plates cured at 15 min, 45 min and 60 min (data not shown).

The autoclaved plates show adequate dimensional stability for use in fuel cells. As shown in FIG. 1, the plates made according to the present process demonstrate the same or better dimensional stability relative to the autoclaved plates. Indeed, the plates made according to the present process also demonstrate less variability in the measured parameter across each plate. Furthermore, curing time is reduced from 2 h to 30 min, and is accomplished without an autoclave. This significantly reduces the cost and complexity of the impregnation process.

EXAMPLE 3

Expanded graphite sheet fuel cell plates identical to those described in Example 1 were prepared as described in Example 2, except that the impregnant was a surfactant-free resin comprising polyglycol dimethacrylate and alkyl methacrylate. The resin is not water soluble.

The impregnated plates were cured in a water bath at a temperature of 80° C. for 30 min.

Four of the cured plates were chosen at random, and the dimensional stability of cured plates was determined as described in Example 1 (samples 16–19). For comparative purposes, the dimensional stability of four identical plates, prepared as described in Example 1, was also determined in the same manner (samples 12–15). The results for the plates are shown in FIG. 2.

The autoclaved plates show adequate dimensional stability for use in fuel cells. As shown in FIG. 2, the plates made according to the present process demonstrate the same or better dimensional stability relative to the autoclaved plates. Indeed, the plates made according to the present process also demonstrate less variability in the measured parameter across each plate. Furthermore, curing time is reduced from 2 h to 30 min, and is accomplished without an autoclave. This significantly reduces the cost and complexity of the impregnation process. Moreover, a very large number of plates (>2,100) were processed without any observed contamination of the curing medium by impregnant.

While curing times between 15 and 60 minutes are used in the above examples, curing time is not essential to the present process. Depending on process parameters and the impregnant selected, a curing time of less than 15 minutes or greater than 60 minutes may be appropriate.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the spirit and scope of the invention.

What is claimed is:

1. A process for impregnating a porous part comprising:
   (a) impregnating the part with an impregnant; and
   (b) curing the impregnated part in a water bath, wherein the impregnant is not water soluble and is an anaerobic impregnant, and wherein the step of impregnating is performed in the substantial absence of oxygen.

2. The process of claim 1, further comprising washing the impregnated part in a washing solution comprising water and a surfactant prior to the curing step.

3. The process of claim 1, further comprising washing the impregnated part in a washing solution comprising a lower aliphatic alcohol prior to the curing step.

4. The process of claim 1, further comprising washing the impregnated part in a washing solution comprising ethanol prior to the curing step.

5. The process of claim 1, further comprising washing the impregnated part in a washing solution comprising naptha prior to the curing step.

6. The process of claim 1, further comprising washing the impregnated part in a washing solution comprising acetone prior to the curing step.

7. The process of claim 1 wherein the impregnant is heat-curable and the water bath is heated to at least the curing temperature of the impregnant.

8. The process of claim 1 wherein the impregnant comprises at least one component selected from the group consisting of polyglycol dimethylacrylates, alkyl methacrylates, and hydroxyalkyl methacrylates.

9. The process of claim 1 wherein the impregnant is substantially surfactant-free.

10. The process of claim 1 wherein the impregnant comprises an acrylic resin.

11. The process of claim 1 wherein the impregnant comprises a methacrylate.

12. The process of claim 1 wherein the part comprises carbon.

13. The process of claim 1 wherein the part comprises expanded graphite.

14. The process of claim 1 wherein the part comprises expanded graphite sheet.

15. The process of claim 1 wherein the impregnant comprises at least one component selected from the group consisting of polyglycol dimethylacrylates, alkyl methacrylates, and hydroxyalkyl methacrylates.

16. A process for impregnating expanded graphite sheet comprising:

(a) impregnating the sheet with a heat-curable impregnant;

(b) washing the impregnated sheet in a washing solution; and (c) curing the washed sheet in a water bath at a curing temperature, wherein the impregnant is not water soluble.

17. The process of claim 16 wherein the impregnant comprises at least one methacrylate and the curing temperature is at least 75° C.

18. The process of claim 16 wherein the impregnant comprises at least one methacrylate and the curing temperature is less than 100° C.

19. The process of claim 17 wherein the impregnated sheet is cured for a time in the range of about 15 minutes to about 1 hour.

20. The process of claim 17 wherein the impregnated sheet is cured for less than 30 minutes.

21. The process of claim 16 wherein the washing solution comprises water and a surfactant.

22. The process of claim 16 wherein the washing solution comprises a lower aliphatic alcohol.

23. The process of claim 16 wherein the washing solution comprises ethanol.

24. A process for impregnating a porous part comprising:

(a) impregnating the part with an impregnant; and (b) curing the impregnated part in a water bath, wherein the impregnant is not water soluble, and wherein the part comprises carbon.

25. The process of claim 24, further comprising washing the impregnated part in a washing solution comprising water and a surfactant prior to the curing step.

26. The process of claim 24, further comprising washing the impregnated part in a washing solution comprising a lower aliphatic alcohol prior to the curing step.

27. The process of claim 24, further comprising washing the impregnated part in a washing solution comprising ethanol prior to the curing step.

28. The process of claim 24, further comprising washing the impregnated part in a washing solution comprising naptha prior to the curing step.

29. The process of claim 24, further comprising washing the impregnated part in a washing solution comprising acetone prior to the curing step.

30. The process of claim 24 wherein the impregnant is heat-curable and the water bath is heated to at least the curing temperature of the impregnant.

31. The process of claim 24 wherein the impregnant is an anaerobic impregnant and curing of the impregnated part is performed in the substantial absence of oxygen.

32. The process of claim 24 wherein the impregnant is substantially surfactant-free.

33. The process of claim 24 wherein the impregnant comprises an acrylic resin.

34. The process of claim 24 wherein the impregnant comprises a methacrylate.

35. The process of claim 24 wherein the part comprises expanded graphite.

36. The process of claim 24 wherein the part comprises expanded graphite sheet.

* * * * *